(12) United States Patent
Nieman

(10) Patent No.: US 11,736,129 B2
(45) Date of Patent: Aug. 22, 2023

(54) LOCAL OSCILLATOR PLACEMENT FOR MIXED NUMEROLOGY IN ORTHOGONAL FREQUENCY DIVISION MULTIPLEXING COMMUNICATIONS

(71) Applicant: NATIONAL INSTRUMENTS CORPORATION, Austin, TX (US)

(72) Inventor: Karl F. Nieman, Austin, TX (US)

(73) Assignee: National Instruments Corporation, Austin, TX (US)

( * ) Notice: Subject to any disclaimer, the term of this patent is extended or adjusted under 35 U.S.C. 154(b) by 506 days.

(21) Appl. No.: 16/667,064

(22) Filed: Oct. 29, 2019

(65) Prior Publication Data
US 2021/0050872 A1 Feb. 18, 2021

Related U.S. Application Data

(60) Provisional application No. 62/885,849, filed on Aug. 13, 2019.

(51) Int. Cl.
*H04B 1/00* (2006.01)
*H04B 17/336* (2015.01)
*H04L 5/00* (2006.01)

(52) U.S. Cl.
CPC ......... *H04B 1/0082* (2013.01); *H04B 17/336* (2015.01); *H04L 5/001* (2013.01); *H04L 5/0094* (2013.01)

(58) Field of Classification Search
CPC ..... H04B 1/0082; H04B 17/336; H04L 5/001; H04L 5/0094
See application file for complete search history.

(56) References Cited

U.S. PATENT DOCUMENTS

| | | | |
|---|---|---|---|
| 6,704,374 B1 | 3/2004 | Belotserkovsky et al. | |
| 6,707,858 B1* | 3/2004 | Davie | H04B 1/28 375/337 |
| 9,413,402 B1* | 8/2016 | Mayer | H03D 1/04 |
| 2007/0207736 A1* | 9/2007 | Ragan | H04B 1/1027 455/63.1 |
| 2012/0177147 A1* | 7/2012 | Park | H04L 27/2647 375/316 |

(Continued)

FOREIGN PATENT DOCUMENTS

| GB | 2310118 A | 8/1997 |
|---|---|---|
| GB | 2361607 A | 10/2001 |

*Primary Examiner* — Harry H Kim
(74) *Attorney, Agent, or Firm* — Kowert, Hood, Munyon, Rankin & Goetzel, P.C.; Jeffrey C. Hood; Luke S. Langsjoen

(57) ABSTRACT

Methods and wireless devices for selecting a local oscillator frequency to use for conducting orthogonal frequency division multiplexing (OFDM) communications. For each of a plurality of local oscillator frequencies, a wireless device determines a respective interference power resultant from the local oscillator frequency for each of a plurality of subcarriers, and determines a cost function by performing a summation over the interference powers associated with each of the plurality of subcarriers. The wireless device selects a first local oscillator frequency with the smallest cost function to use for wireless communications. The wireless device performs wireless communications through the plurality of subcarriers using the first local oscillator frequency.

20 Claims, 10 Drawing Sheets

(56) References Cited

U.S. PATENT DOCUMENTS

| | | | | |
|---|---|---|---|---|
| 2015/0351105 A1* | 12/2015 | Lee | ........................ | H04M 3/22 370/329 |
| 2020/0067612 A1* | 2/2020 | Wu | ....................... | H04L 1/0026 |

* cited by examiner

Algorithm 1 Simplified search for $k^*$ given single component carrier, large $K$, $B \geq \frac{W}{2}$. If $k^* \neq -1$ is returned, then we have found a global minima for $J$.

---
$k = 0, k^* = -1$
while $k < K$ do
    if $\mod(l_k - f_0, \Delta) = 0$ then
        $k^* = k$
        return
    end if
    $k++$
end while
if $k^* = -1$ then
    Perform exhaustive search and full evaluation of $J$ and update $k^*$.
end if

Algorithm 2 Simplified search for $k^*$ given single component carrier, multiple subcarrier spacings $\Delta_a$ used proportionally for $\frac{1}{T_a}$, large $K$, and $B \geq \frac{W}{2}$.

---

$k = 0, k^* = -1$
while $k < K$ do
    $a = 0, y = 0$
    for $a < A$ do
        $y \mathrel{+}= \mathrm{mod}(l_k - f_0, \Delta_a)$
    end for
    if $y = 0$ then
        $k^* = k$
        return
    end if
    $k\mathrel{+}\mathrel{+}$
end while
if $k^* = -1$ then
    Perform exhaustive search and full evaluation of $J$ and update $k^*$.
end if

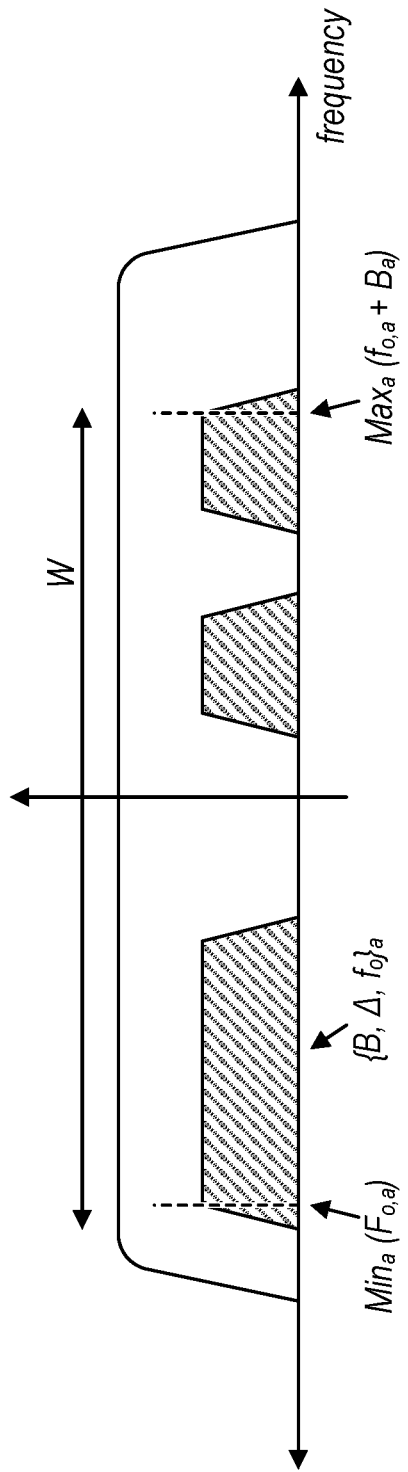

Algorithm 3 Search for optimal LO frequency index $k^*$ for multi-component carrier, mixed numerology.

$k = 0, k^* = -1$
while $k < K$ do
    $a = 0, y = 0$
    for $a < A$ do
        $y \mathrel{+}= \mathrm{mod}(l_k - f_{0,a}, \Delta_a)$
    end for
    if $y = 0$ then
        $k^* = k$
        return
    end if
    $k\mathrel{+}\mathrel{+}$
end while
if $k^* = -1$ then
    Perform exhaustive search and full evaluation of $J$ and update $k^*$.
end if

*FIG. 9*

Algorithm 4 Search for optimal LO frequency when set of LOs is not known *a priori*.

$d = 0, l^* = -1, D_{arr} = \mathbb{D}$ as defined in (12), $D = \text{length}(D_{arr})$
while $d < D$ do
    look up coerced LO when frequency is input $l_{coerced}(D_{arr}(d))$
    if $l_{coerced}(D_{arr}(d)) = D_{arr}(d)$ then
        $l^* = D_{arr}(d)$
        return
    end if
    $d{+}{+}$
end while
if $l^* = -1$ then
    Perform exhaustive search from Algorithm 3 using $l_{coerced}(D_{arr}(d))$.
end if

*FIG. 10*

LOCAL OSCILLATOR PLACEMENT FOR MIXED NUMEROLOGY IN ORTHOGONAL FREQUENCY DIVISION MULTIPLEXING COMMUNICATIONS

PRIORITY CLAIM

This application claims priority to U.S. provisional patent application Ser. No. 62/885,849, entitled "Optimal LO Placement for Structured OFDM Signals of Mixed Numerology", filed Aug. 13, 2019, which is hereby incorporated by reference in its entirety as though fully and completely set forth herein.

TECHNICAL FIELD

Techniques are disclosed relating to wireless communications and more specifically to selecting local oscillator placement for structured orthogonal frequency division multiplexing (OFDM) signals of mixed numerology.

DESCRIPTION OF THE RELATED ART

Wireless devices configured to communicate using OFDM may transmit and receive signals using a plurality of different frequencies. Within an OFDM-capable wireless device, a local oscillator with a particular frequency may be used in conjunction with other electronic components such as a mixer to generate an OFDM signal.

In diverse communication environments of different bandwidths, subcarrier spacing, and numerologies, different local oscillator frequencies may be more or less effective for generating OFDM signals in different circumstances, and it may not be apparent to a wireless device which frequencies are more effective in each circumstance. Accordingly, improvements in the field are desired.

SUMMARY

Techniques are disclosed relating to methods and wireless devices for selecting a local oscillator frequency to use for conducting orthogonal frequency division multiplexing (OFDM) communications.

In some embodiments, for each of a plurality of local oscillator frequencies, a wireless device determines a respective interference power resultant from the local oscillator frequency for each of a plurality of subcarriers, and determines a cost function by performing a summation over the interference powers associated with each of the plurality of subcarriers.

In some embodiments, the wireless device selects a first local oscillator frequency with the smallest cost function to use for wireless communications. The wireless device performs wireless communications through the plurality of subcarriers using the first local oscillator frequency.

Note that the techniques described herein may be implemented in and/or used with a number of different types of devices, including but not limited to, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 6 is an example algorithm for performing a simplified search for a local oscillator frequency when a bandwidth used by a wireless device is greater than half an available bandwidth, according to some embodiments;

FIG. 7 is an example algorithm for performing a simplified search for a local oscillator frequency when there are multiple subcarrier spacings when a bandwidth used by a wireless device is greater than half an available bandwidth, according to some embodiments;

FIG. 8 illustrates local oscillator frequency selection when there are multiple simultaneous component carriers, according to some embodiments;

FIG. 9 is an example algorithm for performing a search for a local oscillator frequency when there are multiple subcarrier spacings and mixed numerology, according to some embodiments; and FIG. 10 is an example algorithm for performing a search for a local oscillator frequency when the set of local oscillator frequencies is not known a priori, according to some embodiments.

Figure 1:
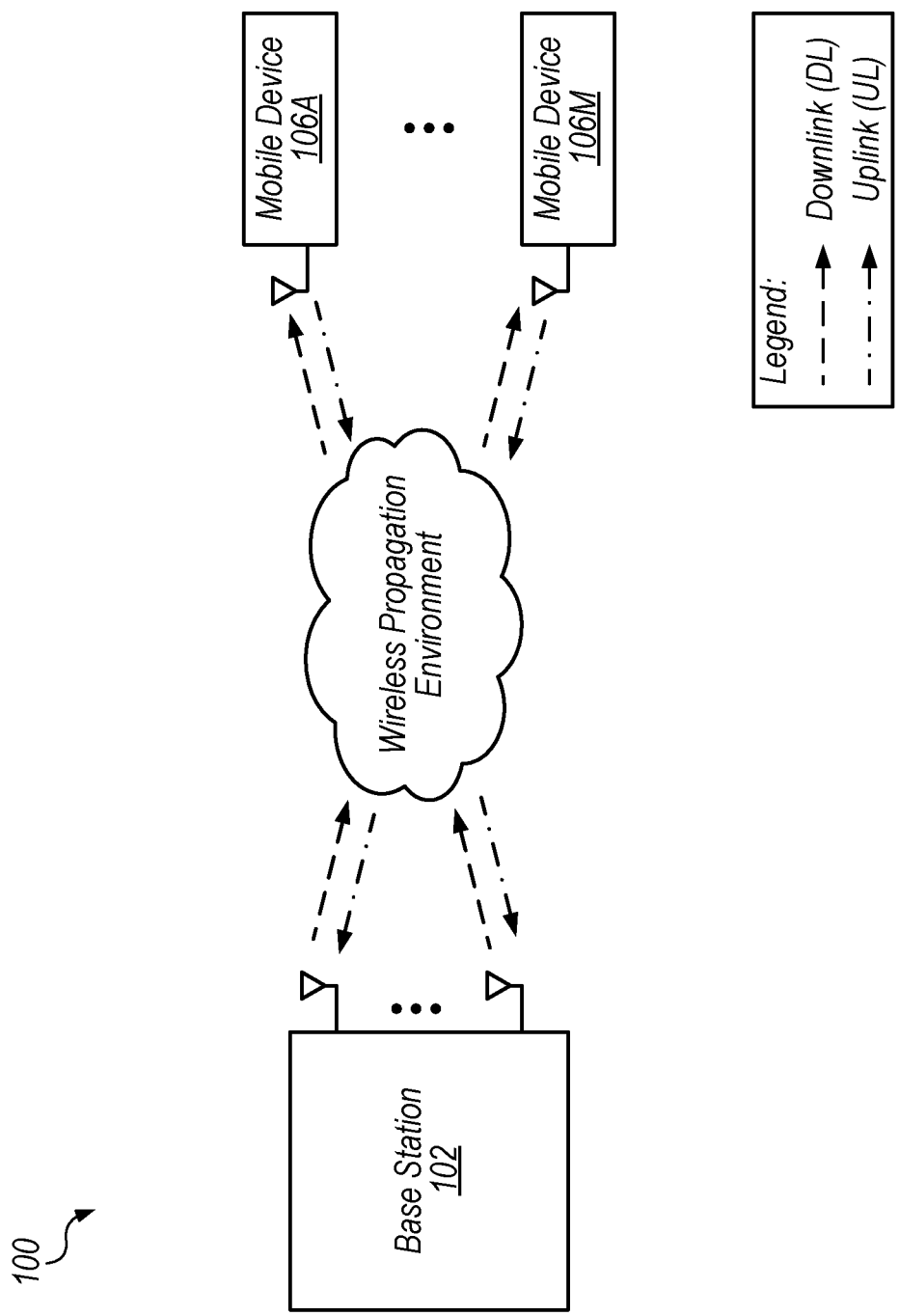
FIG. 1 illustrates exemplary wireless communications between a base station and multiple mobile devices, according to some embodiments.

While the disclosure is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present disclosure as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

DETAILED DESCRIPTION

In the following description, numerous specific details are set forth to provide a thorough understanding of embodiments of the present disclosure. However, one having ordinary skill in the art should recognize that the disclosure may be practiced without these specific details. In some instances, well-known circuits, structures, and techniques have not been shown in detail to avoid obscuring the present disclosure.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

TERMS

The following is a glossary of terms used in the present application:

Memory Medium—Any of various types of non-transitory computer accessible memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," wherein the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism," where the tasks are performed in an interleaved manner, e.g., by time multiplexing of execution threads.

Wireless—refers to a communications, monitoring, or control system in which electromagnetic or acoustic waves carry a signal through space rather than along a wire.

Approximately—refers to a value being within some specified tolerance or acceptable margin of error or uncertainty of a target value, where the specific tolerance or margin is generally dependent on the application. Thus, for example, in various applications or embodiments, the term approximately may mean: within 0.1% of the target value, within 0.2% of the target value, within 0.5% of the target value, within 1%, 2%, 5%, or 10% of the target value, and so forth, as required by the particular application of the present techniques.

This disclosure initially describes, with reference to FIG. 1, an exemplary wireless propagation environment that includes exemplary mobile device and an exemplary base station.

Exemplary Wireless Communication System

FIG. 1 shows an exemplary wireless communication system 100 that includes base station 102 and M mobile devices 106A-M (which may also be referred to as user equipment devices or UEs 106A-M). In the illustrated embodiment, base station 102 includes N antennas configured to transmit and receive data with mobile devices 106. In some embodiments, base station 102 may use time-division duplexing (TDD) or frequency-division duplexing (FDD), for example, to communicate with the different mobile devices. In some embodiments, base station 102 is a multiple input multiple output (MIMO) base station, but in other embodiments non-MIMO techniques may be implemented.

Note that in some embodiments, techniques similar to those described below may be applied to various types of communications channels including non-cellular channels, wired channels, etc. Further, in some embodiments, similar techniques may be applied to storage using one or more potentially lossy storage mediums, where data to be written is encoded and data being read is decoded. This may improve data integrity in data-center applications, e.g., in conjunction with redundant storage. Thus, the disclosed system is included for exemplary purposes and is not intended to limit the scope of the disclosure.

In system 100, mobile devices 106 may concurrently communicate with base station 102 via the wireless propagation environment. In some embodiments, network elements are configured to perform channel estimation and/or fractionally-spaced frequency domain equalization (FS-FDE). In some embodiments, known pilot sequences are transmitted and used for such estimation and/or equalization.

OFDM with Mixed Numerology

Figure 2:
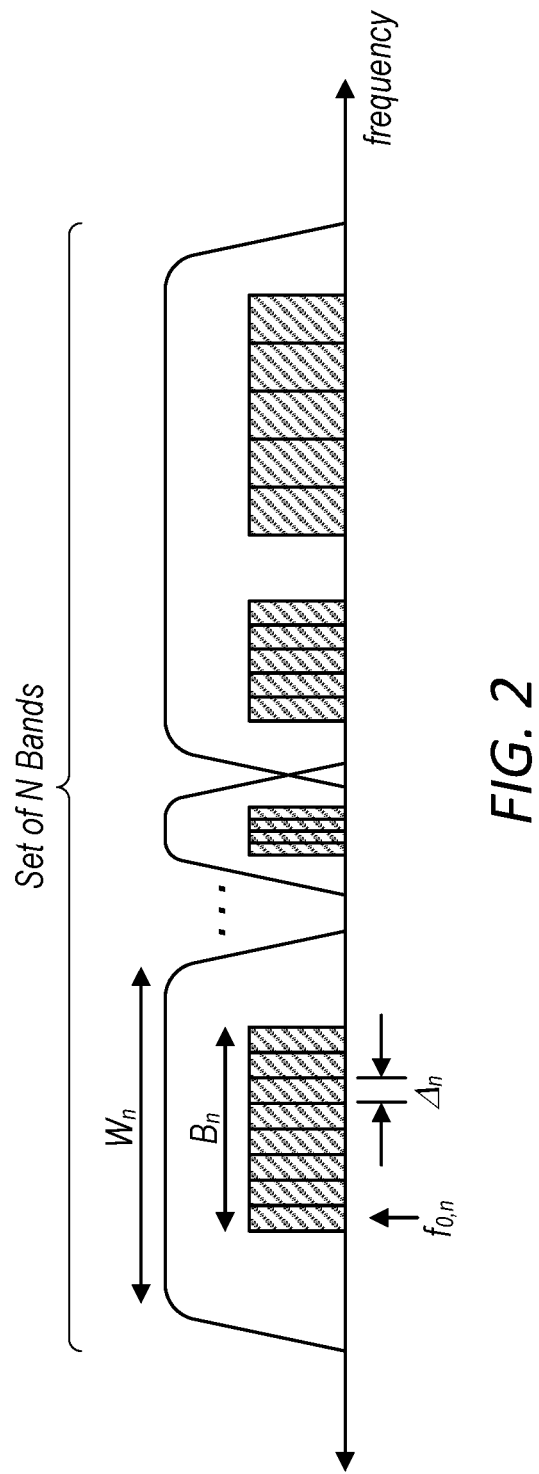
FIG. 2 illustrates a plurality of subcarriers within different orthogonal frequency-division multiplexing (OFDM) bands, according to some embodiments.

Modern wireless communication devices may utilize multiple radio frequency (RF) bands and signal types to conduct wireless communications. In some embodiments, these devices may use orthogonal frequency division multiplexing (OFDM) signals and may support operation over a set of N bands characterized by their first subcarrier frequency $f_{0,n}$, signal bandwidth $B_n$, and subcarrier spacing $\Delta_n$, as shown in FIG. 2. Here, signal bandwidth $B_n = S_n \Delta_n$, where $S_n$ is the number of subcarriers used in band n. In this example, subcarriers are contiguous.

In practice, many wireless communication devices may use discrete local oscillators (LOs) that are capable of synthesizing a discrete set of frequencies in combination with a discrete set of analog filters to cover different bands. Often times, exact LO frequencies may not be achieved, and arbitrary signal placement may be achieved using digital frequency shifting in baseband processing in conjunction with a chosen LO frequency $l_n$ and RF filter with bandwidth $W_n$ to cover the band n.

Figure 3:
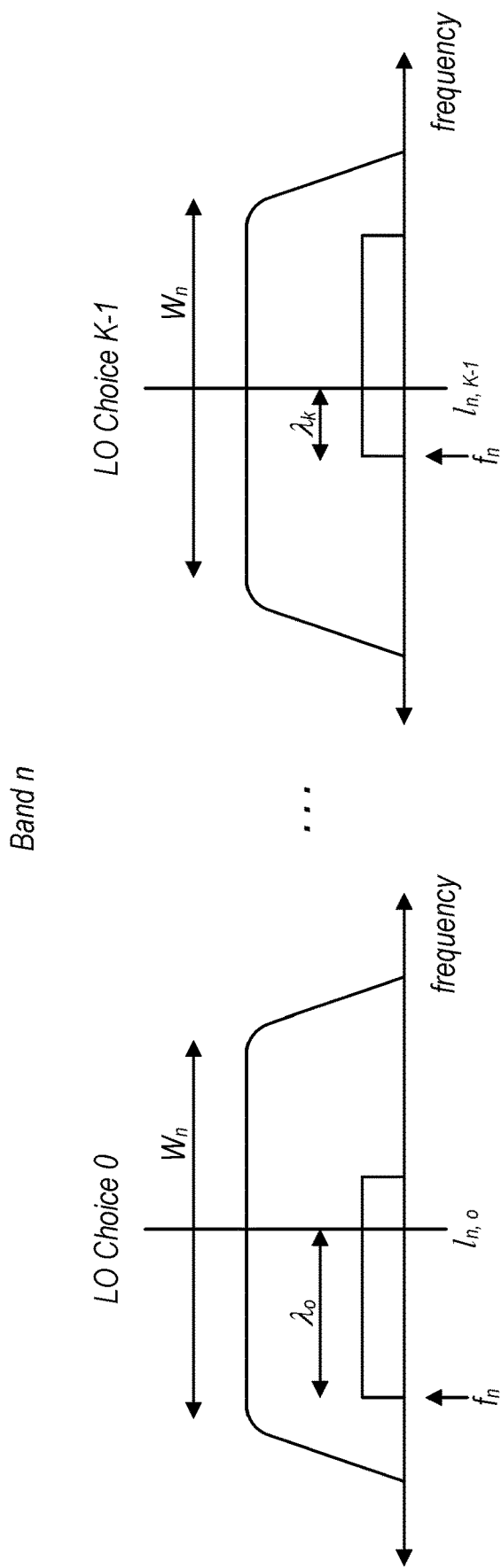
FIG. 3 illustrates two examples of a selected local oscillator frequency, according to some embodiments.

FIG. 3 illustrates two choices for a LO frequency, and the corresponding range of frequencies producible by the chosen LO frequency, according to some embodiments. As illustrated, a digital frequency shift, RF filter bandwidth $W_n$, and LO frequency $l_n$ is utilized to achieve an OFDM signal with a desired frequency $f_{0,n}$ and bandwidth $B_n$. The multiple LO choices may be indexed as $l_{n,k}$.

In many cases, there may be enough flexibility where multiple $l_k$ satisfy the band requirements and may be used with frequency shifts $\lambda_k$ to achieve signaling at band n as shown in FIG. 3. Embodiments herein describe methods and devices configured to choose a desirable set of $l_k$ using the characteristics of the device at a particular band n (e.g., the set of LO frequencies $l_k$ and RF bandwidth W) and OFDM signal structure (e.g., first sub carrier $f_0$, subcarrier spacing $\Delta$, and bandwidth B).

Multiple cases may be accommodated due to the variety of signal types in modern RF communication system implementations, in various embodiments. For example, a simple case exists where a single component carrier with a single subcarrier spacing is present (i.e., a single set of $\{f_0, \Delta, B\}$). Alternatively, a single component carrier may be present with multiple subcarrier spacings, $\{f_0, \Delta_a, B\} \forall a=0, \ldots, A-1$. Alternatively, a general case may arise where there are A component carriers of mixed numerology $\{f_{0,a}, \Delta_a, B_a\} \forall a=0, \ldots, A-1$ within the device RF bandwidth W. Additionally, another case may arise where the set of LOs is not known a priori. These and other situations are treated in greater detail below, according to various embodiments.

Figure 4:
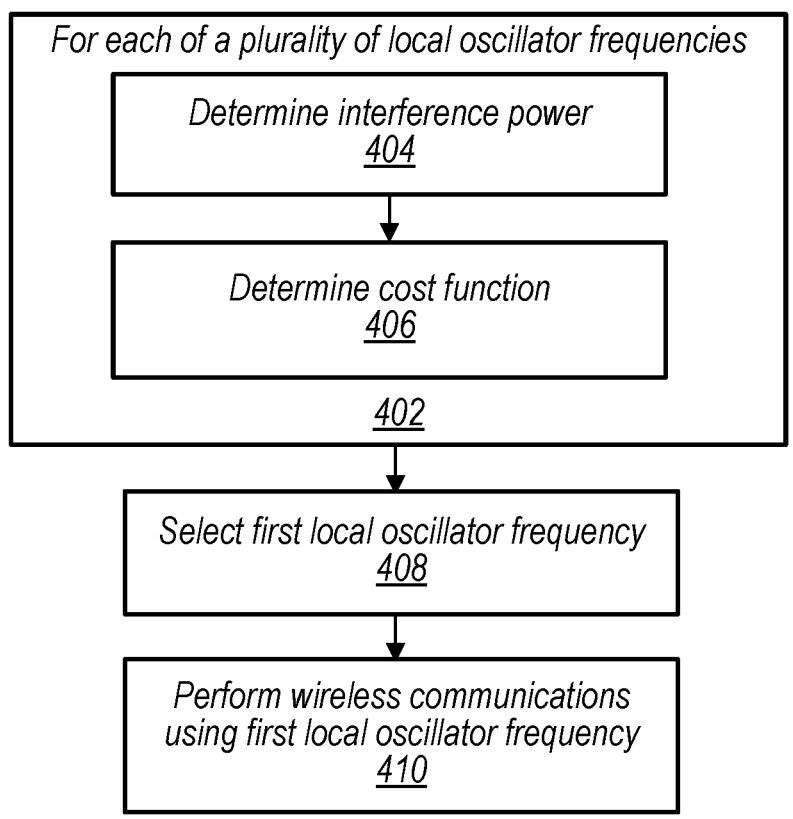
FIG. 4 is a flowchart diagram illustrating an exemplary method for selecting a local oscillator frequency, according to some embodiments.

FIG. 4—Flowchart for Selecting Local Oscillator Frequency

FIG. 4 is a flowchart diagram illustrating a method for selecting a local oscillator frequency by a wireless device, according to some embodiments. The method described in FIG. 4 may be performed by a wireless device configured with at least one antenna for performing wireless communications, a radio coupled to the at least one antenna, and a processor coupled to the radio. In various embodiments, some of the elements of the methods shown may be performed concurrently, in a different order than shown, may be substituted for by other method elements, or may be omitted. Additional method elements may also be performed as desired. As shown, the method may operate as follows.

At 402, a sequence of determinations is made for each of a plurality of local oscillator frequencies, as described in steps 404 and 406 below. For example, a wireless device such as a mobile device 106 may be capable of performing OFDM wireless communications using a plurality of local oscillator frequencies, and a sequence of steps may be performed to determine a desirable local oscillator frequency to use.

In some embodiments, a bandwidth to be used for performing wireless communications is determined, and the determined bandwidth is greater than or equal to half of an available bandwidth for wireless communications. In these embodiments, the plurality of local oscillator frequencies may be selected to occur within the bandwidth to be used for performing the wireless communications based at least in part on determining that the bandwidth to be used for performing the wireless communications is greater than or equal to half of the available bandwidth.

In other embodiments, a bandwidth to be used for performing the wireless communications is determined, and the determined bandwidth is less than half of an available bandwidth for wireless communications. In these embodiments, the plurality of local oscillator frequencies may be selected to occur outside the bandwidth to be used for performing the wireless communications based at least in part on determining that the bandwidth to be used for performing the wireless communications is less than half of the available bandwidth.

At 404, for each local oscillator frequency of the plurality of local oscillator frequencies, a respective interference power resultant from the local oscillator frequency is determined for each of a plurality of subcarriers. The interference power at each subcarrier and for each local oscillator frequency may be determined through an expression such as equation (2), below. In some embodiments, the plurality of subcarriers are comprised within two or more component carriers. In some embodiments, at least a first subcarrier of the plurality of subcarriers utilizes a first subcarrier spacing and at least a second subcarrier of the plurality of subcarriers utilizes a second subcarrier spacing different from the first subcarrier spacing. In these embodiments, the interference powers for the first and second subcarriers may be determined based at least in part on the first and second subcarrier spacings, respectively.

At 406, for each local oscillator frequency of the plurality of local oscillator frequencies, a cost function is determined based at least in part on the interference powers. In some embodiments, determining the cost function based at least in part on the interference powers includes performing a summation over the interference powers associated with each of the plurality of subcarriers. In other words, the interference powers of each subcarrier for a local oscillator frequency may be summed to determine an overall cost function for the local oscillator frequency. Various examples of cost function calculations are shown in equations (4) and (10), according to various embodiments. In some embodiments, the summation over the interference powers associated with each of the plurality of subcarriers is a weighted summation, and the weighted summation is weighted by one or more of subcarrier frequency, subcarrier spacing, component carrier, and physical channel.

At 408, a first local oscillator frequency is selected to use for wireless communications from the plurality of local oscillators frequencies, and the first local oscillator frequency is selected based at least in part on the cost functions. In some embodiments, selecting the first local oscillator frequency to use for wireless communications based at least in part on the cost functions includes selecting a local oscillator frequency with the smallest cost function as the first local oscillator frequency.

At 410, wireless communications are performed through the plurality of subcarriers using the first local oscillator frequency. In other words, the wireless device may conduct OFDM communications using the selected local oscillator frequency with the lowest cost function.

The following sections and numbered paragraphs describe methods for selecting a local oscillator in different situations in greater detail.

Single Component Carrier, Single Subcarrier Spacing

In some embodiments, a single band of operation is utilized with a single component carrier and a single subcarrier spacing. In these embodiments, n may be removed without loss of generality. We may repeat the search process N times to find a desirable LO for all bands to cover. In this case, a single component carrier is present with parameters $\{f_0, \Delta, B\}$ operating in RF bandwidth W. Multiple LOs may be available at frequencies $l_k$ where $k \in K$ and $$K = \left\{ k \in \mathbb{Z}^+ \text{ such that } f_0 - \frac{W}{2} + B \leq l_k \leq f_0 + \frac{W}{2} \right\}, \quad (1)$$

where $\mathbb{Z}^+$ is the set of all positive integers.

A given LO $l_k$ may interfere with the set of OFDM subcarriers in the signaling band. Per this definition, the set of S OFDM subcarriers may be equally spaced and contiguous at frequencies $\{f_0 + \Delta s\}_{s=0, \ldots, S-1}$. A LO placed at frequency $l_k$ may appear as a strong single frequency that is windowed by the OFDM symbol and may appear as a sampled sinc function within the signal band. The LO interference power $p_s$ at subcarrier s is proportional to $$p_s \propto \left| \text{sinc}\left( \frac{f_0 - l_k}{\Delta} + s \right) \right|^2, \quad (2)$$

where $$\text{sinc}(x) = \frac{\sin(\pi x)}{x}.$$

Total LO interference power may be computed by adding the contribution of LO power to each subcarrier for the entire signal band as:

$$\sum_{s=0}^{S-1} p_s \propto \sum_{s=0}^{S-1} \left|\text{sinc}\left(\frac{f_0 - l_k}{\Delta} + s\right)\right|^2. \quad (3)$$

In the presence of forward error correcting block codes, as is common in modern digital communication systems, it may be desirable to force all interference power into the smallest number of bits to provide a higher likelihood of error recovery. This may be done by reinforcing when the argument of the sinc function equals zero. To find a desirable LO placement amongst the K LO frequencies $l_k$ that minimizes the interference power, we may search for $l_{k*}$, where we define a cost function J as:

$$J(l_k, f_0, \Delta, B) = \sum_{s=0}^{\frac{B}{\Delta}-1} \left|\text{sinc}\left(\frac{f_0 - l_k}{\Delta} + s\right) 1\left(\frac{f_0 - l_k}{\Delta} \neq s\right)\right|^2 \quad (4)$$

$$k^* = \arg\min_k J(l_k, f_0, \Delta, B). \quad (5)$$

Figure 5B:
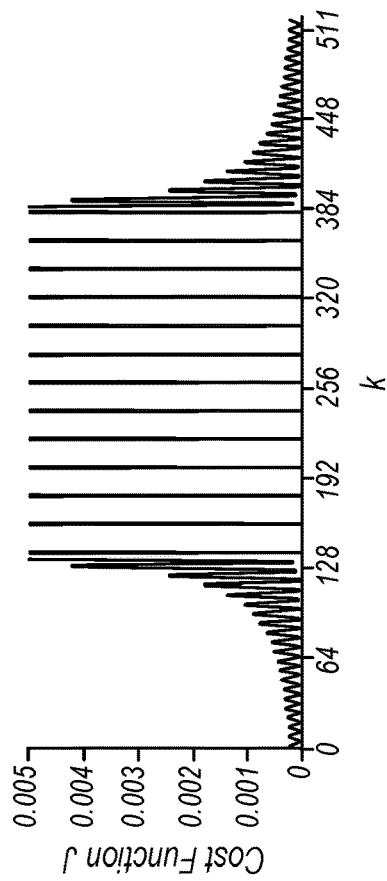
FIGS. 5A-B are two graphs illustrating an example cost function at full scale and zoomed in, according to some embodiments.
Figure 5A:
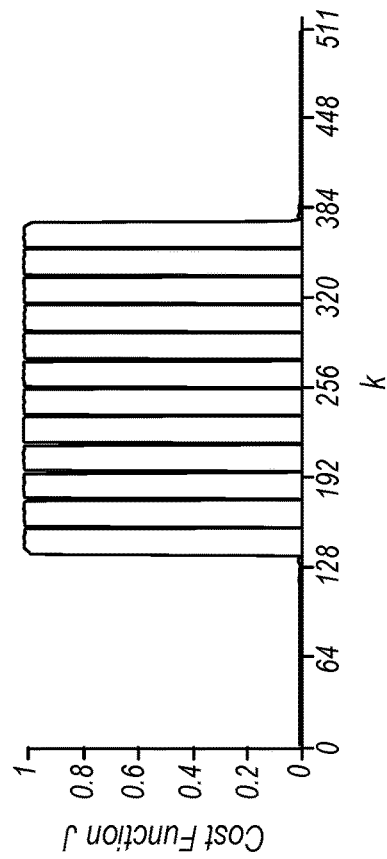

Here, "1(condition)" denotes an indicator function which is 1 when the condition is true and zero otherwise. FIG. 5 shows an example J(•) function where K=512 LOs that are equally spaced every 64.5 kHz (e.g., W=33.024 MHz in this case) are evaluated where $f_0$=3.0 GHz, $\Delta$=30 kHz, B=512$\Delta$=15.36 MHz, and $l_k$=3.0 GHz+(64.5 kHz)(k−256). With these parameters, it can be observed that in band (136<k<376), minima are dominated by the 1(•) term which drives J(•) to zero. Out of band (|k−256|≥120) there may be more structure with J(•) decreasing with distance from band edge.

The search for k* may utilize an exhaustive evaluation of J($l_k$, $f_0$, $\Delta$, B). This may be performed once when supported bands are planned and the result may be cached in the device for fast lookup when setting LO frequencies for a particular band. In certain cases, the search may be simplified as discussed in greater detail in the following paragraphs.

In the particular case of $$B \geq \frac{W}{2},$$

all LO choices may lie within the signal band, in some embodiments. When K is large, it may be likely that at least one LO meets the criteria $$\frac{f_0 - l_k}{\Delta} = s \text{—i.e.}$$

$f_0 - l_k = \Delta s$ (the LO lies at one of the subcarrier locations, or mod($f_0-l_k,\Delta$)=0)—which is a global minima for Equation (5). In this case, $l_{k*}$ may be searched for using a simplified search procedure as shown in Algorithm 1 in FIG. 6.

When $$B \ll \frac{W}{2},$$

it may be likely that a Desirable LO may be found outside the signal bandwidth. In this case, a simplified search may be performed only for those LO frequencies that are not within the signal bandwidth. In these embodiments, the search may be restricted to a subset of the set K from equation (1):

$$\overline{K} = \left\{ k \in \mathbb{Z}^+ \text{ such that } f_0 + \frac{W}{2} \leq l_k \leq f_0 + \frac{W}{2} - \text{Band} \middle| l_k - f_0 - \frac{W}{2} \middle| > B \right\} \quad (6)$$

Single Component Carrier, Multiple Subcarrier Spacing

In some embodiments, a communication system may operate over the same signal band with multiple subcarrier spacings $\{\Delta_a\}_{a=0, \ldots, A-1}$ for band n. These subcarrier spacings may be time-multiplexed with a time share $$\frac{1}{T_a},$$

where $$\Sigma \frac{1}{T_a} = 1.$$

For these embodiments, equation (5) may be extended to evaluate a set of subcarrier spacings and weight the LO interference power according to time share. The desired LO index k* may be found by evaluating the following expression:

$$k^* = \arg\min_k \sum_{a=0}^{A-1} \frac{1}{T_a} \sum_{s=0}^{S-1} \left|\text{sinc}\left(\frac{f_0 - l_k}{\Delta_a} + s\right) 1\left(\frac{f_0 - l_k}{\Delta_a} \neq s\right)\right|^2. \quad (7)$$

For embodiments utilizing a single component carrier and multiple subcarrier spacings, when $$B \geq \frac{W}{2},$$

the search described in equation (7) may be simplified by focusing on the most dominant term, 1(•), and observing that interference power is proportional to $$\frac{1}{\Delta_a T_a} \text{mod}(f_0 - l_k, \Delta_a).$$

A search procedure for this case is shown in Algorithm 2 shown in FIG. 7, according to some embodiments.

Multiple Component Carrier, Multiple Subcarrier Spacing

In some embodiments, a communication device may support multiple signaling bands (indexed by a here) within the same RF band n and data converter, resulting in an RF bandwidth of $W_n$. In these embodiments, we may evaluate a single n without loss of generality, and each OFDM component carrier has parameter sets $\{B, \Delta, F-0\}_a$. The lower and upper band edge of the composite band may be defined in these embodiments as illustrated in FIG. 8 and described by the following expression:

$$\beta = \min_a(f_{0,a}) \text{ and } \rho = \max_a(f_{0,a} + B_a) \quad (8)$$

For these embodiments, the set K is constructed using $\beta$ and $\rho$ as shown in equation (9) below, and the cost function may be constructed similarly to equation (7) and as shown in equation (10) below.

$$K = \left\{ k \in \mathbb{Z}^+ \text{ such that } \beta - \frac{W}{2} + \rho \le l_k \le \beta + \frac{W}{2} \right\} \quad (9)$$

$$J(l_k, \{f_{0,a}, \Delta_a, B_a\}_{\forall a=0,\ldots,A-1}) = \quad (10)$$
$$\sum_{a=0}^{A-1} \sum_{s=0}^{S-1} \left| \text{sinc}\left(\frac{f_{0,a} - l_k}{\Delta_a} + s\right) 1\left(\frac{f_{0,a} - l_k}{\Delta_a} \ne s\right) \right|^2.$$

$$k^* = \arg\min_k J(l_k, f_0, \Delta, B). \quad (11)$$

Using equations (10) and (11), a search for the general case may be constructed with exit criteria if the simple global minima are found, followed by an exhaustive search if that is not successful. Algorithm 4 illustrated in FIG. 9 shows the steps of this search, according to some embodiments.

$l_k$ is not Known a Priori

In some embodiments, when $l_k$ is not known a priori, a structured search may be performed to look only for known optimal LO locations. This may be useful in the case of software-defined radios, where hardware may only be accessed through a hardware abstraction layer (HAL). In such devices, the HAL may automatically choose the closest LO to a desired center frequency $f_c = f_0 + W/2$, and may perform a digital frequency shift $\lambda$. This coerced frequency is referred to herein as $l_{coerced}$. In these embodiments, the set of desirable LO placements may be constructed and a search may be performed for only those LO locations. The set of these desired LO placements, denoted D, is the intersection of the sets on the subcarrier grid for all subcarrier spacings used where D is also the cardinality:

$$D = \bigcap_{a=0}^{A-1} \left\{ \text{mod}\left(f_0 + \frac{W}{2}, \Delta_a\right) + \Delta_a s \right\}_{s=0,\ldots,\lfloor \frac{W-B}{\Delta_a} \rfloor}. \quad (12)$$

As shown in Algorithm 5 illustrated in FIG. 10, a search over the set D may be performed where $l_{coerced}$ is evaluated (e.g., via a software defined radio HAL function call) and the desired LO l* may be returned, in some embodiments.

Weighted Summations

In some embodiments, weighting may be applied to the summation over interference powers. As one example, certain subcarriers may be emphasized or de-emphasized based on their importance, in some embodiments. This may result in a modified function with a weight $\alpha_s$ that is subcarrier dependent. Alternatively or additionally, in some embodiments portions of signals with different subcarrier spacings may be weighted differently. For example, emphasis may be applied using a weight to allow the different portions of a signal to be asymmetrically weighted in order to emphasize them compared to other portions of the signal. Additionally or alternatively, in some embodiments the different component carriers may be weighted differently. For example, different component carriers may be weighted by importance and/or relative power such that equation (11) captures this criteria as well. Additionally or alternatively, in some embodiment different physical channels may be weighted differently in the summation over interference powers. For example, physical downlink control channel (PDCCH) subcarriers may be of higher importance than physical downlink shared channel (PDSCH) subcarriers in 5G New Radio (NR) downlink communications, and the PDCCH subcarriers may be weighted more strongly than the PDSCH subcarriers.

For some embodiments where multiple bands are utilized, the knowledge of some LOs may be shared across the bands. Advantageously, this may allow for fewer unique LOs to be utilized globally in the device.

Exemplary Devices

In some embodiments, a mobile device (e.g., one of mobile devices 106) configured to store, generate, and/or transmit the disclosed pilot symbols may be a device with cellular communication capability such as a mobile phone, a hand-held device, a wearable device, a computer or a tablet, or virtually any type of wireless device.

The mobile device may include a processor that is configured to execute program instructions stored in memory. The mobile device may perform any of the method embodiments described herein by executing such stored instructions. Alternatively, or in addition, the mobile device may include a programmable hardware element such as an FPGA (field-programmable gate array) that is configured to perform any of the method embodiments described herein, or any portion of any of the method embodiments described herein.

The mobile device may include one or more antennas for communicating using one or more wireless communication protocols or technologies. The mobile device may include a radio which may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

The mobile device may include a system on chip (SOC), which may include portions for various purposes. For example, SOC may include processor(s) which may execute program instructions for the mobile device and display circuitry which may perform graphics processing and provide display signals to the display. The processor(s) may also be coupled to memory management unit (MMU), which may be configured to receive addresses from the processor(s) and translate those addresses to locations in memory and/or to other circuits or devices, such as the display circuitry, wireless communication circuitry, a connector I/F, and/or the display. The MMU may be configured to perform memory protection and page table translation or set up. In some embodiments, the MMU may be included as a portion of the processor(s).

The SOC may be coupled to various other circuits of the mobile device. For example, the mobile device may include various types of memory (a connector interface (e.g., for coupling to a computer system, dock, charging station, etc.), the display, and wireless communication circuitry (e.g., for LTE, Wi-Fi, GPS, etc.).

In some embodiments, a base station (e.g., base station 102) that is configured to store, generate, and/or transmit the disclosed pilot symbols may processor(s) which may execute program instructions for the base station. The processor(s) may also be coupled to memory management unit (MMU), which may be configured to receive addresses from the processor(s) and translate those addresses to locations in memory or to other circuits or devices.

The base station may include at least one network port. The network port may be configured to couple to a telephone network and provide a plurality of devices, such as mobile device 106, access to the telephone network as described above in FIG. 1.

The network port (or an additional network port) may also or alternatively be configured to couple to a cellular network, e.g., a core network of a cellular service provider. The core network may provide mobility related services and/or other services to a plurality of devices, such as UE devices 106. In some cases, the network port may couple to a telephone network via the core network, and/or the core network may provide a telephone network (e.g., among other UE devices serviced by the cellular service provider).

The base station may include at least one antenna, and possibly multiple antennas. The antenna(s) may be configured to operate as a wireless transceiver and may be further configured to communicate with UE devices 106 via a radio. The antenna may communicates with the radio via a communication chain. The communication chain may be a receive chain, a transmit chain or both. The radio may be configured to communicate via various wireless telecommunication standards, including, but not limited to, LTE, LTE-A, UMTS, CDMA2000, Wi-Fi, etc.

The base station may be configured to communicate wirelessly using multiple wireless communication standards. In some instances, the base station may include multiple radios, which may enable the base station to communicate according to multiple wireless communication technologies. For example, as one possibility, the base station may include an LTE radio for performing communication according to LTE as well as a Wi-Fi radio for performing communication according to Wi-Fi. In such a case, the base station may be capable of operating as both an LTE base station and a Wi-Fi access point. As another possibility, the base station may include a multi-mode radio which is capable of performing communications according to any of multiple wireless communication technologies (e.g., LTE and Wi-Fi).

The base station may include hardware and software components for implementing or supporting implementation of features described herein. The processor of the base station may be configured to implement part or all of the methods described herein, e.g., by executing program instructions stored on a memory medium (e.g., a non-transitory computer-readable memory medium). Alternatively, the processor may be configured as a programmable hardware element, such as an FPGA (Field Programmable Gate Array), or as an ASIC (Application Specific Integrated Circuit), or a combination thereof.

Embodiments of the present disclosure may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computing device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   for each of a plurality of local oscillator frequencies:
      determining a respective interference power resultant from the local oscillator frequency for each of a plurality of subcarriers; and
      determining a cost function based at least in part on the interference powers, wherein determining the cost function based at least in part on the interference powers comprises performing a summation over the interference powers associated with each of the plurality of subcarriers;
   selecting a first local oscillator frequency to use for wireless communications from the plurality of local oscillators frequencies, wherein the first local oscillator frequency is selected based at least in part on the cost functions; and performing wireless communications through the plurality of subcarriers using the first local oscillator frequency.

2. The method of claim 1,
wherein the summation over the interference powers associated with each of the plurality of subcarriers comprises a weighted summation, wherein the weighted summation is weighted by one or more of:
subcarrier frequency;
subcarrier spacing;
component carrier; and
physical channel.

3. The method of claim 1,
wherein selecting the first local oscillator frequency to use for wireless communications based at least in part on the cost functions comprises selecting a local oscillator frequency with the smallest cost function as the first local oscillator frequency.

4. The method claim 1, the method further comprising:
determining that a bandwidth to be used for performing the wireless communications is greater than or equal to half of an available bandwidth;
selecting the plurality of local oscillator frequencies to occur within the bandwidth to be used for performing the wireless communications based at least in part on determining that the bandwidth to be used for performing the wireless communications is greater than or equal to half of the available bandwidth.

5. The method claim 1, the method further comprising:
determining that a bandwidth to be used for performing the wireless communications is less than half of an available bandwidth;
selecting the plurality of local oscillator frequencies to occur outside the bandwidth to be used for performing the wireless communications based at least in part on determining that the bandwidth to be used for performing the wireless communications is less than half of the available bandwidth.

6. The method of claim 1,
wherein at least a first subcarrier of the plurality of subcarriers utilizes a first subcarrier spacing and at least a second subcarrier of the plurality of subcarriers utilizes a second subcarrier spacing different from the first subcarrier spacing;
wherein the interference powers for the first and second subcarriers are determined based at least in part on the first and second subcarrier spacings, respectively.

7. The method of claim 1,
wherein the plurality of subcarriers is comprised within two or more component carriers.

8. A wireless device, comprising:
one or more antennas, wherein the one or more antennas are configured to conduct orthogonal frequency division multiplexing (OFDM) communications using any of a plurality of local oscillator frequencies;
a processor coupled to the one or more antennas,
wherein the wireless device is configured to:
for each of the plurality of local oscillator frequencies:
determine a respective interference power resultant from the local oscillator frequency for each of a plurality of subcarriers; and
determine a cost function based at least in part on the interference powers, wherein determining the cost function based at least in part on the interference powers comprises performing a summation over the interference powers associated with each of the plurality of subcarriers;

select a first local oscillator frequency to use for wireless communications from the plurality of local oscillators frequencies, wherein the first local oscillator frequency is selected based at least in part on the cost functions; and
perform wireless communications through the plurality of subcarriers using the first local oscillator frequency.

9. The wireless device of claim 8,
wherein the summation over the interference powers associated with each of the plurality of subcarriers comprises a weighted summation, wherein the weighted summation is weighted by one or more of:
subcarrier frequency;
subcarrier spacing;
component carrier; and
physical channel.

10. The wireless device of claim 8,
wherein selecting the first local oscillator frequency to use for wireless communications based at least in part on the cost functions comprises selecting a local oscillator frequency with the smallest cost function as the first local oscillator frequency.

11. The wireless device of claim 8, wherein the wireless device is further configured to:
determine that a bandwidth to be used for performing the wireless communications is greater than or equal to half of an available bandwidth;
select the plurality of local oscillator frequencies to occur within the bandwidth to be used for performing the wireless communications based at least in part on determining that the bandwidth to be used for performing the wireless communications is greater than or equal to half of the available bandwidth.

12. The wireless device of claim 8, wherein the wireless device is further configured to:
determine that a bandwidth to be used for performing the wireless communications is less than half of an available bandwidth;
select the plurality of local oscillator frequencies to occur outside the bandwidth to be used for performing the wireless communications based at least in part on determining that the bandwidth to be used for performing the wireless communications is less than half of the available bandwidth.

13. The wireless device of claim 8,
wherein at least a first subcarrier of the plurality of subcarriers utilizes a first subcarrier spacing and at least a second subcarrier of the plurality of subcarriers utilizes a second subcarrier spacing different from the first subcarrier spacing;
wherein the interference powers for the first and second subcarriers are determined based at least in part on the first and second subcarrier spacings, respectively.

14. The wireless device of claim 8,
wherein the plurality of subcarriers is comprised within two or more component carriers.

15. A non-transitory computer-readable memory medium comprising program instructions which, when executed by a processor, cause a wireless device to:
for each of the plurality of local oscillator frequencies:
determine a respective interference power resultant from the local oscillator frequency for each of a plurality of subcarriers; and
determine a cost function based at least in part on the interference powers, wherein determining the cost function based at least in part on the interference powers comprises performing a summation over the interference powers associated with each of the plurality of subcarriers;

select a first local oscillator frequency to use for wireless communications from the plurality of local oscillators frequencies, wherein the first local oscillator frequency is selected based at least in part on the cost functions, wherein selecting the first local oscillator frequency to use for wireless communications based at least in part on the cost functions comprises selecting a local oscillator frequency with the smallest cost function as the first local oscillator frequency; and perform wireless communications through the plurality of subcarriers using the first local oscillator frequency.

16. The non-transitory computer-readable memory medium of claim 15,
wherein the summation over the interference powers associated with each of the plurality of subcarriers comprises a weighted summation, wherein the weighted summation is weighted by one or more of:
subcarrier frequency;
subcarrier spacing;
component carrier; and
physical channel.

17. The non-transitory computer-readable memory medium of claim 15, wherein the program instructions are further executable to cause the wireless device to:
determine that a bandwidth to be used for performing the wireless communications is greater than or equal to half of an available bandwidth;
select the plurality of local oscillator frequencies to occur within the bandwidth to be used for performing the wireless communications based at least in part on determining that the bandwidth to be used for performing the wireless communications is greater than or equal to half of the available bandwidth.

18. The non-transitory computer-readable memory medium of claim 15, wherein the program instructions are further executable to cause the wireless device to:
determine that a bandwidth to be used for performing the wireless communications is less than half of an available bandwidth;
select the plurality of local oscillator frequencies to occur outside the bandwidth to be used for performing the wireless communications based at least in part on determining that the bandwidth to be used for performing the wireless communications is less than half of the available bandwidth.

19. The method of claim 1,
wherein the respective interference powers, $p_s$, are determined as $p_s \propto$ $$\left|\mathrm{sinc}\left(\frac{f_0 - l_k}{\Delta} + s\right)\right|^2,$$

where $$\mathrm{sinc}(x) = \frac{\sin(\pi x)}{x},$$

$F_0$ is a baseband subcarrier frequency, $l_k$ is the local oscillator frequency for which the respective interference power is being determined, s is the subcarrier for which the respective interference power is being determined, and $\Delta$ is a subcarrier spacing.

20. The wireless device of claim 8,
wherein the respective interference powers, $p_s$, are determined as $p_s \propto$ $$\left|\mathrm{sinc}\left(\frac{f_0 - l_k}{\Delta} + s\right)\right|^2,$$

where $$\mathrm{sinc}(x) = \frac{\sin(\pi x)}{x},$$

$f_0$ is a baseband subcarrier frequency, $l_k$ is the local oscillator frequency for which the respective interference power is being determined, s is the subcarrier for which the respective interference power is being determined, and $\Delta$ is a subcarrier spacing.

* * * * *